Patented Dec. 1, 1953

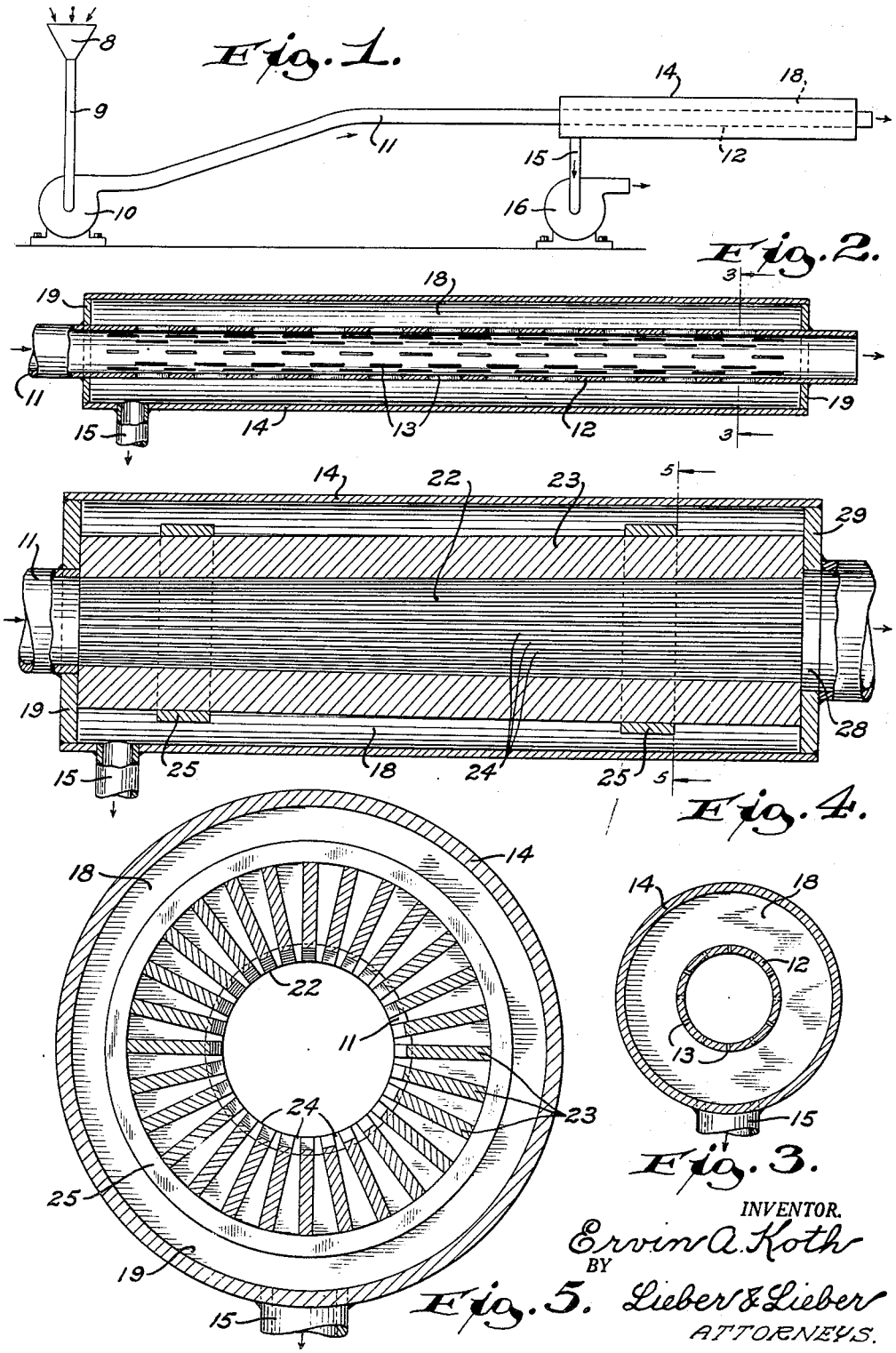

2,661,095

UNITED STATES PATENT OFFICE 2,661,095

FLUENT MATERIAL CONCENTRATOR

Ervin A. Koth, Milwaukee, Wis., assignor to The Vilter Manufacturing Co., Milwaukee, Wis., a corporation of Wisconsin Application September 6, 1950, Serial No. 183,434

3 Claims. (Cl. 210—164)

The present invention relates in general to improvements in the art concentrating suspensions of solids in liquids, and relates more specifically to improvements in the construction and operation of equipment for automatically extracting excess fluid from a fluent mixture of liquid and solids so as to concentrate the solid particles of the mass.

The primary object of my invention is to provide an improved system for concentrating a fluent mixture of liquid and solids capable of being transported in bulk, in order to ultimately retain the mass of solids with minimum residual liquid.

In the refrigeration, chemical, and other industries, various substances such as snow, flake-ice, slurry, dross, or the like containing solid particles in suspension in liquid so as to permit hydraulic transportation of the mixture through conduits or troughs, are frequently produced by diverse methods; and it is usually desirable after the fluent mixture has been transferred to a predetermined locality, to remove excess fluid so that only the concentrated mass of solids remains with relatively slight residual liquid content. The excess liquid in the original mixture may thus be utilized to effect hydraulic transportation of the suspended solids, but when the final destination of the product is about to be reached, it is imperative that the excess fluid be rapidly and effectively withdrawn, preferably without interrupting the flow of mixture from the source of supply thereof. This is especially true in the art of producing flake or slush-ice wherein the crystalline ice particles are being constantly produced in the presence of considerable moisture or free water, and it is very desirable to remove this excess water so as to concentrate the ice crystals into a mass of snow ice remote from the ice producing machines and at points of final utilization of the product for packing purposes or the like.

It is therefore an important object of the present invention to provide simple and efficient equipment for removing excess liquid from a moving mass or stream of mixed solids and liquid in order to concentrate the solids and to deliver the same in relatively dry condition.

Another object of this invention is to provide an improved unit for rapidly and continuously concentrating solid particles suspended in liquid as the mixture of these ingredients flows from a source of supply to a solids delivery zone.

A further object of my invention is to provide an improved system for concentrating flake-ice which is produced in the presence of an abundance of water, after the excess liquid has been utilized to transport the ice particles or crystals away from the ice producing equipment.

Still another object of my present invention is to provide an improved device for automatically and continuously removing excess liquid from crystalline or porous particles which are carried in suspension and are being transported from place to place by the liquid.

An additional specific object of the invention is to provide simple and automatically functioning apparatus for concentrating a moving stream or column of liquid bearing solids, rapidly and at relatively low cost.

These and other objects and advantages of this invention will be apparent from the following detailed description.

A clear conception of the features constituting my present improvement, and of the construction and operation of several typical concentrating units which may be utilized in connection with the improved system, may be had by referring to the drawing accompanying and forming a part of this specification in which like reference characters designate the same or similar parts in the various views.

Fig. 1 is a diagram showing a typical embodiment of my improved concentrating system in its entirety;

Fig. 2 is an enlarged longitudinal central section through a simple type of my improved concentrating unit;

Fig. 3 is a further enlarged transverse section through the concentrating unit of Fig. 2, taken along the line 3—3;

Fig. 4 is a relatively large longitudinal central section through a modified type of improved concentrating unit; and Fig. 5 is a further enlarged transverse section through the unit of Fig. 4, taken along the line 5—5.

The gist of the present invention is the provision of a system for automatically concentrating the solid particles of a fluent mixture wherein the solids are carried in suspension within excess liquid, by removing the latter with the aid of pressure differential after it has been utilized to hydraulically transport the solid ingredients from one locality to another, and while the invention has been shown and described herein as being advantageously applied for the purpose of concentrating slush-ice or flake-ice with pressure and vacuum pumps, it is not my desire or intention to unnecessarily restrict the utility of the improvement by virtue of this specific embodiment. It is also contemplated that specific descriptive terms used herein be given the broadest interpretation consistent with the actual disclosure.

Referring to Fig. 1 of the drawing, the improved concentrating system and unit shown diagrammatically therein, comprises in general, a hopper 8 adapted to receive a fluent mixture of solids and excess liquid, and communicating through a duct 9 with the inlet of a pressure pump 10 the outlet of which is in open communication with mixture transporting conduit 11 having one or more portions 12 near its delivery end provided with longitudinal slits 13; and a tubular casing 14 surrounding and spaced from the slitted conduit portion or portions 12 and having a discharge pipe 15 leading therefrom to the suction side of a vacuum pump 16.

The hopper 8 may receive its supply of mixture preferably in abundance and continuously from any suitable source such as a slush or flake-ice making machine which constantly produces ice crystals in the presence of considerable excess water within which the porous ice flakes or crystals are suspended so as to provide a fluent mixture. The mixture receiving and transporting device as shown in Fig. 1, is a continuously operating pump 10 capable of forcing the solid bearing fluent mixture at relatively high speed through the conduit 11 and through the slitted portion 12 of this conduit in the form of a continuous solid stream, and the slits 13 are preferably relatively long and narrow and are arranged in staggered successive annular series as clearly shown in Figs. 2 and 3. The width of the slits 13 will in each case depend upon the characteristics of the solid particles being concentrated and should not be sufficient to permit these particles to pass therethrough.

The tubular casing 14 which surrounds the slitted conduit portion 12 is spaced therefrom to provide an enclosed annular space 18 in open communication with all of the slits 13 and with the liquid discharge pipe 15 which leads to the pump 16, and this pump is preferably a continuously operating vacuum producing device adapted to constantly create a partial vacuum within the sealed space 18 and to remove liquid therefrom when the conduit 11 is filled with the mixture. The slitted conduit portion 12 may be mounted within the tubular outer casing 14 with the aid of end heads 19, and these assembled elements constitute a simple type of the improved concentrating unit for automatically and continuously removing excess liquid from the solid particle.

A more refined type of concentrating unit embodying the invention is shown in Figs. 4 and 5, wherein the mixture transporting conduit portion 22 which extends through the tubular outer casing 14 is composed of an annular series of relatively inclined flat radial bars 23 forming longitudinally tapered narrow slits 24 and a conducting passage of gradually increasing transverse cross-section throughout the length of the portion 22. These radial bars 23 may be held in proper relative position by rings 25 embracing the bar series and welded or otherwise secured thereto, and the opposite ends of the bars 23 may be likewise secured to the end heads 19, 29. The end head 29 at the delivery end of the modified concentrating unit, has a discharge opening 28 therein which is considerably greater in diameter than that of the adjacent end of the conduit portion 22, and the annular space 18 of this refined unit is also in open communication with the tapered slits 24 and with the vacuum creating device through a pipe 15.

During normal operation of the improved concentrating system and referring particularly to the simplified form of Figs. 1, 2, and 3, the hopper 8 should be kept abundantly supplied with a fluent mixture of solids and liquid, and the pumps 10, 16 should be operating continuously with the pressure pump 10 having a considerably greater volumetric capacity than the vacuum pump 16. As previously indicated, the slits 13 in the conduit portion should be sufficiently narrow so as to prevent the solid particles of the fluent mixture from passing through these slits, and the entire conduit 11 should be maintained filled with the mixture being treated. The pressure pump 10 will then transport the mixture received from the hopper 8 in the form of a continuous stream through the elongated conduit 11 thus hydraulically conveying the suspended solids into the concentrating unit.

As the mixture enters and continues to advance through the slitted conduit portion 12, the partial vacuum created within the annular space 18 by the suction pump 16, causes some of the porous particles of the mixture to bridge over the slits 13 and thereafter withdraws liquid from all peripheral portions of the advancing stream through these bridges and through the adjoining slits into the annular chamber 18 from which the liquid is ultimately removed through the pipe 15 by the pump 16. The excess liquid continues to be withdrawn throughout the entire length of and all around the conduit portion 12, and the relatively dry concentrate solids are ultimately delivered en masse from the discharge end of the conduit 11 beyond the concentrating unit, while the removed liquid may either be wasted or returned to the mixture producing machine for re-use.

The refined concentrating unit shown in Figs. 4 and 5 will function in somewhat the same manner during normal operation, but the longitudinally flaring slits 24 and the increasing diameter of the conduit portion 22 as well as the enlarged opening 28 at the delivery ends of the bars 23, present several distinct advantages. In this modified concentrator, the advancing column or core of solid particles may expand as it passes longitudinally through the conduit portion 22, and if the slits 24 tend to clog or become filled with fine solid particles the flaring of the slits 24 both longitudinally and radially as shown in Figs. 4 and 5 will promptly relieve such clogging. The enlarged opening 28 at the discharge ends of the slits 24 will also cause solids which may lodge in these slits, to be carried into the solids delivery conduit beyond the concentrator, thus preventing these particles from being drawn into the suction space 18.

In each of the improved concentrators, the width of the slits must be selected so as to avoid excessive loss of solid particles therethrough, and while these slits have been shown relatively wide in the drawing for the sake of clearness, they should in fact be very narrow and the modified slits 24 should be only slightly flared so as to avoid escape of solids at their larger ends. In both cases the porous particles of solid material will bridge the slits and these internal bridges will act as bearing surfaces for the advancing core of solid particles. Both of the improved units are purely concentrators for the solids which are conveyed hydraulically from a supply source to a zone of ultimate utilization, and they do not grade the solid particles but merely remove the excess conveying liquid when the transportation of the solids has been effected.

From the foregoing detailed description of the invention it should be apparent that I have in fact provided a system and unit for automatically and continuously hydraulically conveying and for rapidly and effectively concentrating masses of solid particles, in a most efficient manner. The improved equipment is especially adapted to handle porous crystalline solids such as snow or flake-ice or crystalline non-soluble chemicals, wherein the crystals are capable of bridging the slits so as to provide a porous barrier over each slit. The improved concentrating units are simple and compact in construction being devoid of valves and similar complications, and may be made of any desired length and diameter dependent upon the capacity required, but any suitable means or devices other than pumps may be utilized to urge the fluent mixture through the system and to create the partial vacuum within the space 18.

While I have shown an embodiment of the invention utilizing a pressure pump 10 and a vacuum pump 16, the use of two pumps as shown in the illustrations is not an essential part of the idea. In some cases the use of two constant displacement pumps provides a convenient mode of proportioning the materials. In other cases the fluid mixture may have sufficient static head so that no pumps are required at all and the degree of liquid extraction may then be regulated by the pressures maintained on the two outlets. The ease with which the pressure drop across the straining slits 13 and 24 may be manipulated is one of the major advantages of this type of concentrator, and makes it exceedingly flexible in adaptation.

It is also noteworthy that by hydraulically transporting the suspended solid particles, these solids are constantly agitated so as to free the liquid, and by providing the slits entirely around the concentrating section of the conduit 11 and throughout the entire length thereof most effective removal of excess liquid from the rapidly advancing stream is assured. The longitudinal flaring of the concentrating portion 22 also causes the advancing core of solids to expand and decelerate as it approaches the outlet thereby further releasing liquid from the mass and the longitudinal flaring of the slits 24 and the enlarged opening 28 in this refined embodiment furthermore tends to prevent clogging and assures proper functioning of the concentrator with minimum attention.

It should be understood that it is not desired to limit this invention to the exact details of construction of the system and concentrating units or to the precise functioning thereof, herein shown and described, for various modifications within the scope of the appended claims may occur to persons skilled in the art.

I claim:

1. In a concentrator for solid particles suspended in excess liquid, a tubular casing having a liquid outlet, and an elongated conduit extending through said casing and being spaced from the casing interior to provide an annular space communicating with said outlet, said conduit being formed of an annular series of relatively inclined and spaced bars extending longitudinally of the conduit and providing elongated narrow longitudinally flaring and radially enlarging slits connecting the conduit interior with said space.

2. In a concentrator for solid particles suspended in excess liquid, means forming an elongated conduit having a mixture inlet at one end and a solids outlet of at least as great area as said inlet at its opposite end and being provided between said inlet and outlet with a multiplicity of elongated narrow tapered slits extending along the conduit and enlarging toward said outlet and radially of the conduit axis, means for continuously injecting a mixture of solids and liquid through said inlet in quantities sufficient to maintain the conduit filled while the mixture flows along said enlarging slits, and means for drawing excess liquid from the advancing mixture through said slits while the solids continue to fill and proceed freely through said outlet.

3. In a concentrator for solid particles suspended in excess liquid, means forming an elongated conduit having a mixture inlet at one end and a larger solids outlet at its opposite end and being provided between the inlet and outlet with a gradually enlarging portion having a multiplicity of elongated narrow slits gradually enlarging toward said outlet and radially of the conduit axis, means for forcing a mixture of solids and liquid through said slitted conduit portion in quantities sufficient to maintain the conduit filled, and means for removing excess liquid from the advancing mixture through said slits while the solids continue to fill and to proceed freely through said outlet.

ERVIN A. KOTH.

References Cited in the file of this patent

UNITED STATES PATENTS

| Number | Name | Date |
|---|---|---|
| 292,947 | Porter et al. | Feb. 5, 1884 |
| 483,847 | Jaeger | Oct. 4, 1892 |
| 1,301,683 | Goddu | Apr. 22, 1919 |
| 1,331,732 | Wait | Feb. 24, 1920 |
| 2,452,407 | Walker | Oct. 26, 1948 |
| 2,463,814 | Skinner | Mar. 8, 1949 |
| 2,569,748 | DeGrave | Oct. 2, 1951 |

FOREIGN PATENTS

| Number | Country | Date |
|---|---|---|
| 293,668 | Great Britain | July 12, 1928 |